(12) United States Patent
Nagel et al.

(10) Patent No.: US 11,988,193 B2
(45) Date of Patent: May 21, 2024

(54) DEVICE FOR A WIND TURBINE

(71) Applicant: Siemens Gamesa Renewable Energy A/S, Brande (DK)

(72) Inventors: Eirik Nagel, Flensburg (DE); John Nieuwenhuizen, Horsens (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 560 days.

(21) Appl. No.: 17/276,940

(22) PCT Filed: Aug. 28, 2019

(86) PCT No.: PCT/EP2019/072917
§ 371 (c)(1),
(2) Date: Mar. 17, 2021

(87) PCT Pub. No.: WO2020/057917
PCT Pub. Date: Mar. 26, 2020

(65) Prior Publication Data
US 2022/0034304 A1  Feb. 3, 2022

(30) Foreign Application Priority Data
Sep. 21, 2018 (EP) .................................... 18196037

(51) Int. Cl.
*F03D 17/00* (2016.01)
*H01Q 13/20* (2006.01)
(52) U.S. Cl.
CPC ........... *F03D 17/00* (2016.05); *H01Q 13/203* (2013.01); *F05B 2270/805* (2013.01)
(58) Field of Classification Search
CPC . H01Q 13/203; F05B 2270/805; F03D 17/00; F03D 7/06; G01M 5/0091;
(Continued)

(56) References Cited

U.S. PATENT DOCUMENTS 3,515,485 A * 6/1970 Frank .................... B64C 27/008
416/61
5,479,826 A * 1/1996 Twerdochlib ............ G01H 9/00
73/660
(Continued)

FOREIGN PATENT DOCUMENTS

CN 102628430 A 8/2012
CN 204140276 U 2/2015
(Continued)

OTHER PUBLICATIONS

PCT International Search Report & Written Opinion dated Nov. 18, 2019 corresponding to PCT International Application No. PCT/EP2019/072917.
(Continued)

*Primary Examiner* — Peter M Bythrow
(74) *Attorney, Agent, or Firm* — Schmeiser, Olsen & Watts LLP

(57) ABSTRACT

A wind turbine has an object position and/or speed detection device including: at least one leaky feeder, at least one electromagnetic transmitter connected to the least one leaky feeder for transmitting a first electromagnetic signal along the at least one leaky feeder towards a target object, whose position is to be detected, at least one electromagnetic receiver connected to the least one leaky feeder for receiving from the at least one leaky feeder a second electromagnetic signal, the second electromagnetic signal reflected from the target object when the first electromagnetic signal hits the target object, a processing unit connected to the electromagnetic transmitter and the electromagnetic receiver and configured to analyze the first electromagnetic signal and the second electromagnetic signal for determining the position and/or speed and/or direction and/or the size of the target object.

13 Claims, 5 Drawing Sheets

(58) Field of Classification Search
CPC .......... G01S 7/411; G01S 13/42; G01S 13/88;
G01S 13/08
See application file for complete search history.

(56) References Cited

U.S. PATENT DOCUMENTS

| | | | | |
|---|---|---|---|---|
| 5,534,869 | A * | 7/1996 | Harman | G08B 13/2497 340/850 |
| 8,319,361 | B2 * | 11/2012 | Lucks | F03D 17/00 416/61 |
| 9,000,970 | B2 * | 4/2015 | Andersen | G01B 15/06 342/6 |
| 9,239,042 | B2 * | 1/2016 | Frankenstein | F03D 17/00 |
| 9,330,449 | B2 * | 5/2016 | Newman | G06T 7/0004 |
| 9,856,860 | B2 * | 1/2018 | Vangen | G01S 13/505 |
| 10,746,625 | B2 * | 8/2020 | Santra | G01S 13/88 |
| 10,774,814 | B2 * | 9/2020 | David | F03D 17/00 |
| 10,774,815 | B2 * | 9/2020 | Zhang | F03D 1/0675 |
| 2004/0057828 | A1 * | 3/2004 | Bosche | F03D 7/046 416/31 |
| 2007/0098551 | A1 * | 5/2007 | Viertl | G01M 11/086 416/61 |
| 2008/0101930 | A1 * | 5/2008 | Bosche | F03D 7/0224 416/61 |
| 2010/0021298 | A1 * | 1/2010 | Sandvad | F03D 17/00 416/61 |
| 2010/0084864 | A1 * | 4/2010 | Lucks | F03D 7/0288 290/44 |
| 2010/0124498 | A1 * | 5/2010 | Kabatzke | F03D 7/047 416/61 |
| 2010/0253569 | A1 * | 10/2010 | Stiesdal | G01B 11/026 367/99 |
| 2011/0150647 | A1 * | 6/2011 | Gierlich | F03D 17/00 416/61 |
| 2011/0285581 | A1 * | 11/2011 | Hol | F03D 17/00 342/25 R |
| 2012/0120400 | A1 | 5/2012 | Weigel et al. | |
| 2012/0200444 | A1 * | 8/2012 | Andersen | G01B 15/06 342/6 |
| 2014/0266861 | A1 * | 9/2014 | Egedal | G01B 15/06 342/118 |
| 2014/0327569 | A1 * | 11/2014 | Fun | F03D 1/04 342/26 D |
| 2015/0159632 | A1 * | 6/2015 | Vangen | F03D 7/04 416/61 |
| 2016/0040655 | A1 | 2/2016 | Kötting | |
| 2018/0010583 | A1 * | 1/2018 | Andersen | H01R 4/66 |
| 2018/0124498 | A1 | 5/2018 | Margalit | |
| 2019/0164400 | A1 * | 5/2019 | Harman | G08B 13/26 |
| 2019/0181689 | A1 * | 6/2019 | Oyama | G01S 13/88 |
| 2022/0186713 | A1 * | 6/2022 | Nagel | H04B 5/28 |

FOREIGN PATENT DOCUMENTS

| | | |
|---|---|---|
| CN | 107 064 648 A | 8/2017 |
| DE | 102012015456 A1 | 2/2014 |
| EP | 2453136 A1 | 5/2012 |
| EP | 2769091 A2 | 8/2014 |
| EP | 2864632 A2 | 4/2015 |
| EP | 3 043 064 A1 | 7/2016 |
| GB | 2 142 508 A | 1/1985 |
| WO | WO2013053361 A2 | 4/2013 |
| WO | WO2014000744 A2 | 1/2014 |
| WO | WO 2017193201 A1 | 11/2017 |

OTHER PUBLICATIONS

Jochen Moll, Viktor Krozer, Philip Arnold, Manfred Dürr, Ralph Zimmermann, Rahmi Salman, Daniel Hübsch, Dimitry Pozdniakov, Herbert Friedmann, Andreas Nuber, Markus Scholz, Peter Kraemer: "Radar-based Structural Health Monitoring of Wind Turbine Blades"; 19th World Conference on Non-Destructive Testing 2016.
Chuck Livingstone, Shen Chiu (DRDC—Ottawa Research Centre): "Ground based radar observations of wind turbines"; Defense Research and Development Canada; Scientific Report; DRDC-RDDC-2014-R57; Aug. 2014.
Maddalena Violetti, Anja K. Skrivervik, Qin Xu, Michael Hafner: "New Microwave Sensing System for Blade Tip Clearance Measurement in Gas Turbines", IEEE 2012, p. 307-310.
Fumio Suzuki: "Thin Leaky Coaxial Cable LCX-5D for 2.4 GHz Wireless LAN"; Fujikura Technical Review, 2013; p. 90-93.
Enrico Pignone, Paolo Verrecchia; Stefano Patrone; Andrea Randazzo: "Innovative Technologies for GT Hot Gas Path Tip Clearance Measurement".
Atsuhiko Niwa and Fumio Suzuki: "Super-Thin Leaky Coaxial Cable ZLCX-2.5D" Fujikura Technical Review, 2014; p. 17-20.
Hirtenfelder et al—Cables and Connectors; Mar. 2015; A Special Supplement to Microwave Journal.
Mark R. Woike, James W. Roeder, Christopher E. Hughes, and Timothy J. Bencic: "Testing of a Microwave Blade Tip Clearance Sensor at the NASA Glenn Research Center"; Apr. 2009; NASA/TM—2009-215589; AIAA-2009-1452; Prepared for the 47th Aerospace Sciences Meeting sponsored by the American Institute of Aeronautics and Astronautics Orlando, Florida, Jan. 5-8, 2009.
European Search Report and Written Opinion of the European Searching Authority dated Mar. 22, 2019 for Application No. 18196037.8.

* cited by examiner

DEVICE FOR A WIND TURBINE

CROSS-REFERENCE TO RELATED APPLICATIONS

This application claims priority to PCT Application No. PCT/EP2019/072917, having a filing date of Aug. 28, 2019, which is based on EP Application No. 18196037.8, having a filing date of Sep. 21, 2018, the entire contents both of which are hereby incorporated by reference.

FIELD OF TECHNOLOGY

The following relates to a device for detection the position and/or speed of an object in the surroundings of a tower of a wind turbine. Particularly, but not exclusively, the device of the following may be used to detect the position and/or speed of a blade of a wind turbine.

BACKGROUND

In the above defined technical field, systems are known, which comprises a plurality of radar units operatively configured to emit and receive radar signals. The radar units are typically mounted on and around the wind turbine tower, the radar units being positioned so as to measure reflections of an emitted radar signal from the turbine blade. A processing unit is configured to receive measurement data from the radar unit and to determine, by analysis of Doppler shift, time of flight, phase and amplitude in received radar signals relative to transmitted signals due to movement of the blade towards or away from the turbine tower, the velocity of the blade in the direction towards or away from the turbine tower. This permits to calculate the trajectory and, in particular, the absolute speed and position of the blade.

Using radar units to measure blade position based on the Doppler Effect is for example described in EP 2864632 and permits to avoid the installation of other types of sensors on the blades or nacelle of the wind turbine. This reduces manufacturing and maintenance costs of the wind turbine, since sensors positioned on the tower are easier to replace in the field.

However such a solution is not yet optimal considering that for objects which are rotating, like the blades or nacelles, the installation of a plurality of radar units is required.

A single radar unit may be in fact used but only for detecting the passage of the blade at a single location. At least two radar units (horizontal mounted) are required for following the position of blade around the nacelle yawing. One radar unit is able to detect the revolution of the blade at a specific position. More than two single radar units may be used for improving redundancy, resolution and confidence of the detection, thus however further increasing costs and software resources. Each radar unit requires a dedicated processing unit for elaborating the signals and deriving the position and speed of the blade.

SUMMARY

An aspect relates to a simple, efficient and cost effective object position and/or speed detection device for a wind turbine, by solving the inconveniences mentioned with reference to the above cited conventional art.

A further scope is that of permitting to follow the trajectory of an object in surrounding of the wind turbine, in particular permitting to monitor the position and/or speed of a blade of a wind turbine.

According to a first aspect of embodiments of the present invention a wind turbine including a tower, at least one rotatable blade and an object position and/or speed detection device is provided. The object position and/or speed detection device comprises:
  at least one leaky feeder,
  at least one electromagnetic transmitter connected to the least one leaky feeder for transmitting a first electromagnetic signal along the least one leaky feeder towards a target object, whose position is to be detected,
  at least one electromagnetic receiver connected to the least one leaky feeder for receiving from the at least one leaky feeder a second electromagnetic signal, the second electromagnetic signal being reflected from the target object when the first electromagnetic signal hits the target object,
  a processing unit connected to the electromagnetic transmitter and the electromagnetic receiver and configured to analyze the first electromagnetic signal and the second electromagnetic signal for determining the position and/or speed and/or direction and/or the size of the target object.

The electromagnetic transmitter and the electromagnetic receiver may be integrated in a single component, i.e., a transceiver comprising both functionalities.

The target object may be at least one rotatable blade of the wind turbine.

Target object may be:
  birds, bats, ice,
  intruders,
  waves, i.e., for the detection of height direction and speed of the waves in offshore applications.

According to a second aspect of embodiments of the present invention a method for detecting the position and/or speed of a target object in an area comprising a wind turbine is provided, the method comprising the steps of:
  providing at least one leaky feeder in an area comprising a wind turbine,
  transmitting a first electromagnetic signal along the at least one leaky feeder towards a target object, whose position, speed and/or direction as well as size is to be detected,
  measuring a second electromagnetic signal received from along the at least one leaky feeder, the second electromagnetic signal being generated from the target object when reflecting the first electromagnetic signal,
  analysing the first electromagnetic signal and the second electromagnetic signal for determining the position of the target object.

By using one or more leaky feeders the number or transmitters and receiver may be considerably reduced. In particular, according to embodiments of the present invention only one transmitter and only one receiver may be advantageously used. The area where the position and/or speed of a target object can be detected is extendable by simply increasing the length of the leaky feeder, which is simpler and cheaper than increasing the number of transmitter and receivers. One single processing unit is also enough for analysing the signals from the transmitters and to the receiver and calculate the position and speed, direction and size of the target object.

According to possible embodiments of the invention, two leaky feeders are used respectively connected to one electromagnetic transmitter and to one electromagnetic receiver. This may simplify the implementation of control software with reference to a solution with only one leaky feeder.

According to other possible embodiments of the invention, a plurality of leaky feeders are used, the plurality of leaky feeders comprising a first and a second group of leaky feeders respectively connected to the at least one electromagnetic transmitter and to the at least one electromagnetic receiver. Advantageously, each of the plurality of leaky feeders may be conveniently geometrically configured for optimally following the trajectories of the target objects or of a plurality of target objects.

According to possible embodiments of the invention, the at least one leaky feeder is geometrically configured as an arc around the tower. In particular, the at least one leaky feeder may be geometrically configured as a loop (or part/segment of a loop) surrounding the tower of the wind turbine.

The at least one leaky feeder and/or the at least one electromagnetic transmitter and/or the least one electromagnetic receiver are installed on or inside the tower of the wind turbine.

According to such configuration, the position and/or speed detection device is a component installed on the wind turbine.

In particular, the device of embodiments of the present invention may be installed on one blade of the wind turbine or on the tower. More particularly, the position and/or speed detection device may be installed inside the tower as well for protecting it from environmental influences, and the direct and indirect effects of a lightning strike.

In wind turbine for offshore application the position and/or speed detection device may be installed on other components of the wind turbine, fixedly attached to the tower.

According to other possible configurations, the position and/or speed detection device may be distanced from the tower of the wind turbine.

According to possible embodiments of the invention, the first and second electromagnetic signals may be radar or ultrasonic signals.

In such embodiments, wherein the at least one leaky feeder is conveniently chosen as a coaxial leaky cable.

Alternatively, according to other possible embodiments of the invention where the first and second electromagnetic signals have greater frequencies, the at least one leaky feeder is a leaky waveguide or leaky stripline.

BRIEF DESCRIPTION

Some of the embodiments will be described in detail, with references to the following Figures, wherein like designations denote like members, wherein.

DETAILED DESCRIPTION

Figure 1:
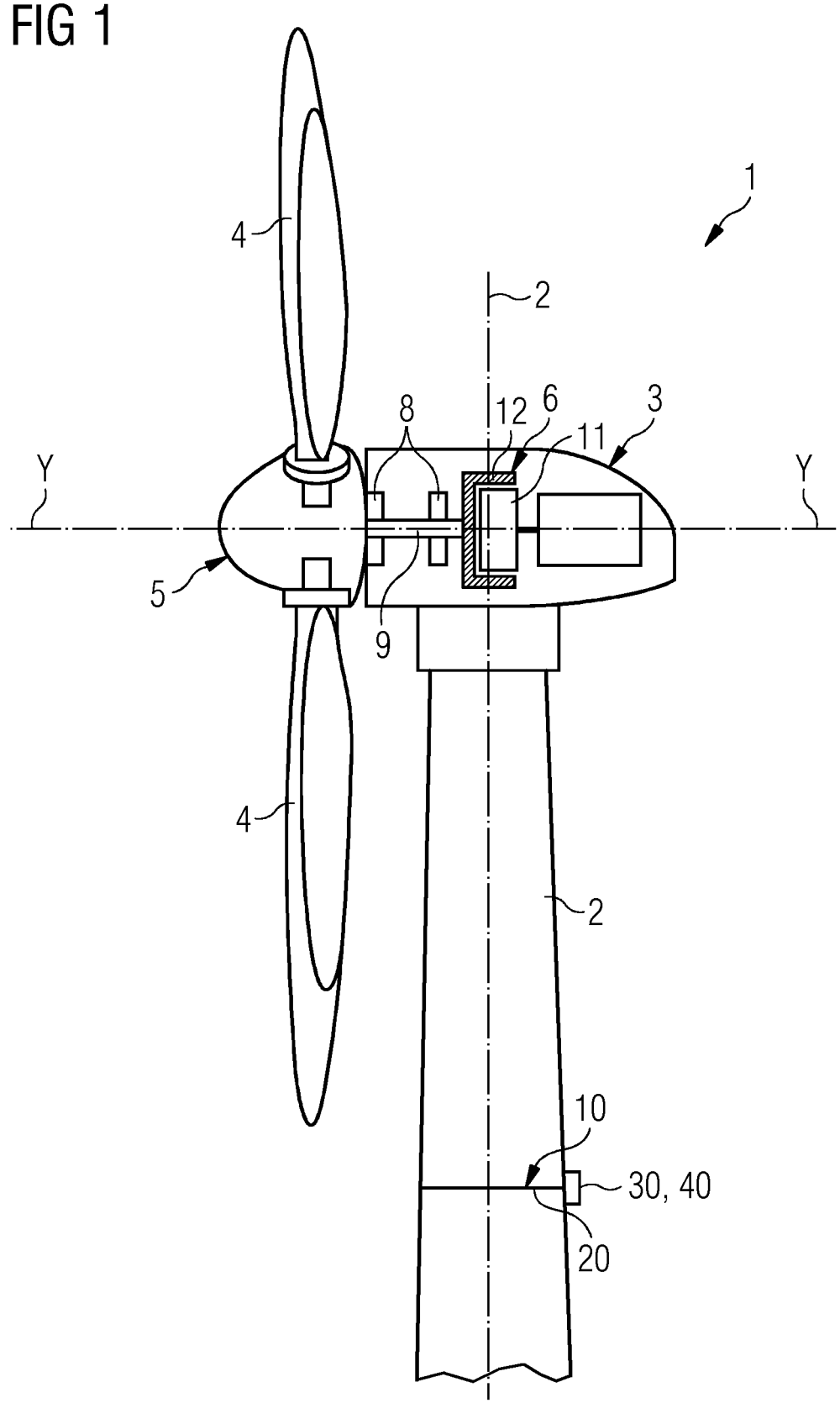
FIG. 1 shows a schematic section of a wind turbine including embodiments of the present invention.

FIG. 1 shows a partial cross-sectional view of a wind turbine 1 including an object position and speed detection device 10 according to embodiments of the invention.

The wind turbine 1 comprises a tower 2, which is mounted on a non-depicted fundament. A nacelle 3 is arranged on top of the tower 2. In between the tower 2 and the nacelle 3 a yaw angle adjustment device (not shown) is provided, which is capable of rotating the nacelle around a vertical yaw axis Z.

The wind turbine 1 further comprises a wind rotor 5 having one or more rotational blades 4 (in the perspective of FIG. 1 only two blades 4 are visible). The wind rotor 5 is rotatable around a rotational axis Y. In general, when not differently specified, the terms axial, radial and circumferential in the following are made with reference to the rotational axis Y.

The blades 4 extend radially with respect to the rotational axis Y.

The wind turbine 1 comprises an electric generator 6 having a stator 11 and a rotor 12. The rotor 12 is rotatable with respect to the stator 11 about the rotational axis Y to generate electrical power. The electric generator 6 and the generation of electrical power through embodiments of the present invention is not a specific object of embodiments of the present invention and therefore not described in further detail.

The object position detection device 10 according to embodiments of the present invention comprises:
   at least one leaky feeder 20,
   at least one electromagnetic transmitter 30 connected to the least one leaky feeder 20,
   at least one electromagnetic receiver 40 connected to the least one leaky feeder 20,
   at least one final resistance 50 or termination connected to the least one leaky feeder 20,
   a processing unit 300 connected to the electromagnetic transmitter 30 and the electromagnetic receiver 40.

The leaky feeder 20 is a communications elongated component, which leaks an electromagnetic wave which is transmitted along the component. The leaky feeder 20 may be constituted by a leaky coaxial cable or a leaky waveguide or a leaky stripline. The leaky feeder is connected to an electromagnetic transmitter 30 in order to transmit a first electromagnetic signal 100 along the leaky feeder 20 towards a target object, whose position is to be detected. The leaky feeder 20 comprises a plurality of slots to allow the first electromagnetic signal 100 to leak out of the leaky feeder 20 along its entire length towards the target object.

The slots may be, according to possible embodiments, regularly distributed along the length of the leaky feeder 20. According to other possible embodiments of the present invention, the leaky feeder 20 is a normal coaxial cable with low optical coverage of the outside conductor (mesh or slots/apertures), which also leaks electromagnetic waves.

The leaky feeder 20 may be provided with a heating system (not shown) in case severe over icing conditions are possible. Heating may be provided by air flowing between in and outside conductor or by electrical current which runs in inner or outer conductor of leaky feeder.

The first electromagnetic signal 100 may be, according to possible embodiments, a radar signal or an ultrasonic signal. In cases where the first electromagnetic signal 100 is a radar signal or an ultrasonic signal the leaky feeder 20 is preferably configured as a coaxial leaky cable.

According to other embodiments, particularly where the first electromagnetic signal 100 is of higher frequency, the leaky feeder 20 is preferably configured as a leaky waveguide.

In general, according to the different embodiments of the present invention, the first electromagnetic signal 100 may be of any frequency, provided that it can be transmitted to the target object and be reflected by the target object.

When the first electromagnetic signal 100 impinges the target object, a reflected second electromagnetic signal 200 is transmitted towards the leaky feeder.

The plurality of slots of the leaky feeder 20 allow the second electromagnetic signal 200 to leak into the leaky feeder 20 towards the electromagnetic receiver 40.

The processing unit 300 analyzes the first electromagnetic signal 100 and the second electromagnetic signal 200 for determining the position, speed, direction and size of the target object. According to the known (radar) principles of the amplitude, phase, Doppler effect and of ToF (Time of Flight), the processing unit 300 is able to compare the first electromagnetic signal 100 and the second electromagnetic signal 200 caused by a moving object and consequently to determine the speed and/or position and/or direction and/or size of such object. The position of such object may be an angle with respect to a rotational axis or the three-dimensional position with respect to a system of Cartesian axes.

Figure 2:
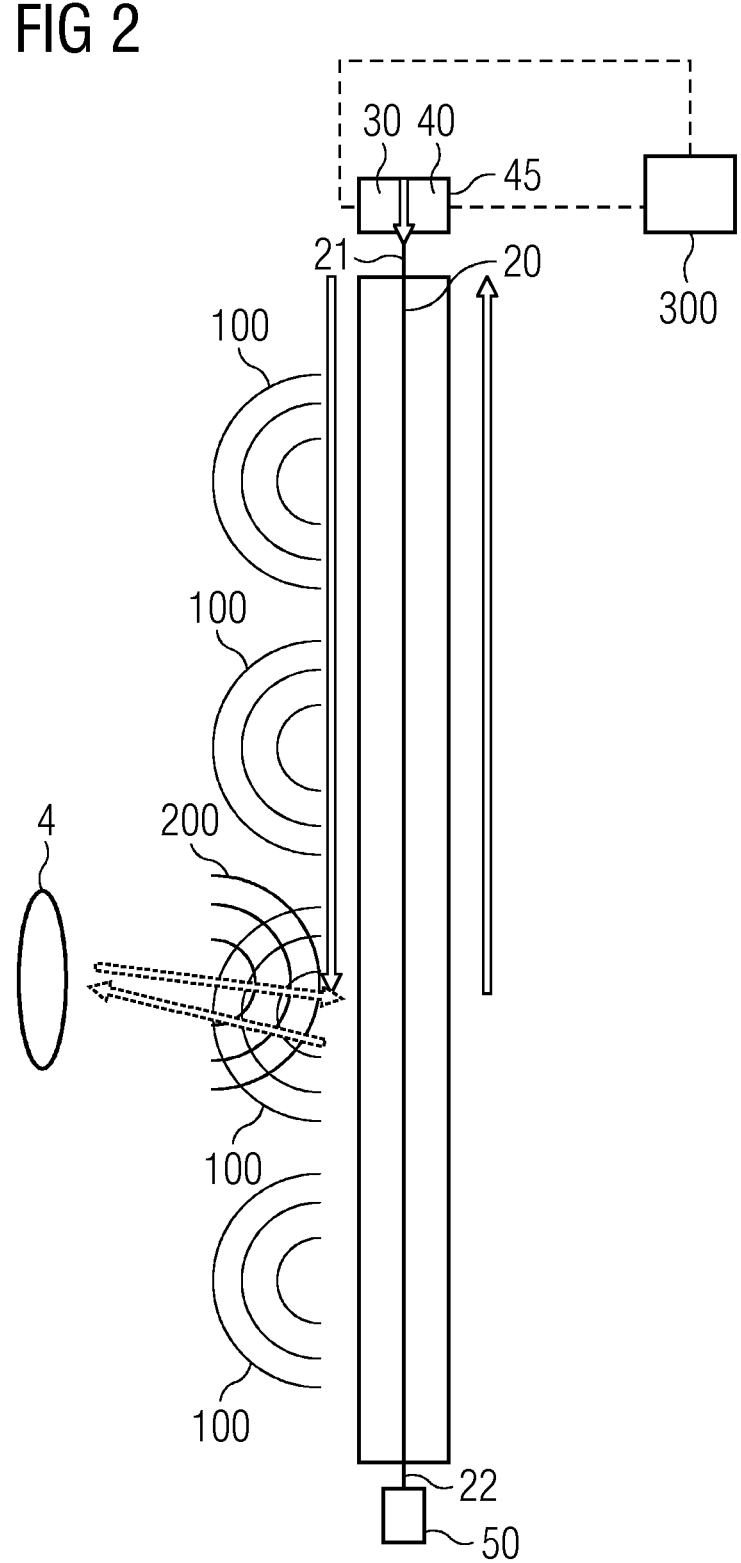
FIG. 2 shows a schematic view of an object position detection device according to a first exemplary embodiment of the present invention.

As shown in FIG. 2, a first embodiment of the object position and speed detection device 10 comprises only one leaky feeder 20. The leaky feeder 20 extends between a first end 21 and a second end 22. The first end 21 is connected to an electromagnetic transceiver 45 comprising one electromagnetic transmitter 30 and one electromagnetic receiver 40. The second end 22 is connected to one final resistance 50. The object position detection device 10 is used for detecting the position of a rotational blade 4 of the wind turbine 1. According to the present invention, the positions of all the rotational blades 4 of the wind turbine 1 are detectable.

According to embodiments of the present invention, the electromagnetic transmitter 30 and the electromagnetic receiver 40 may be both connected to the first end 21 or to the second end 22 via a signal splitter or y-adapter.

According to other embodiments of the present invention, the electromagnetic transmitter 30 is connected to the first end 21 and the electromagnetic receiver 40 is connected to the second end 22.

The leaky feeder 20 must not connected directly to the electromagnetic transmitter 30 and to the electromagnetic receiver 40, e.g., a non-leaky feeder cable (i.e., a normal coaxial cable) may be interposed between the leaky feeder 20 and the electromagnetic transmitter 30 and/or the electromagnetic receiver 40. A normal coaxial cable may be connected directly to the electromagnetic transmitter 30 and to the electromagnetic receiver 40 or it may be used for interconnection.

According to embodiments of the present invention, the target object is the nacelle 2 for the detection of the position of the nacelle about the vertical yaw axis Z.

According to embodiments of the present invention, other target objects may be detected in an area comprising a wind turbine 1, for example animals or intruders or changing waves (in offshore applications).

The leaky feeder 20 of FIG. 2 is geometrically configured as a rectilinear line.

According to other embodiments of the present invention, the leaky feeder 20 may be geometrically configured as an arc.

Figure 3:
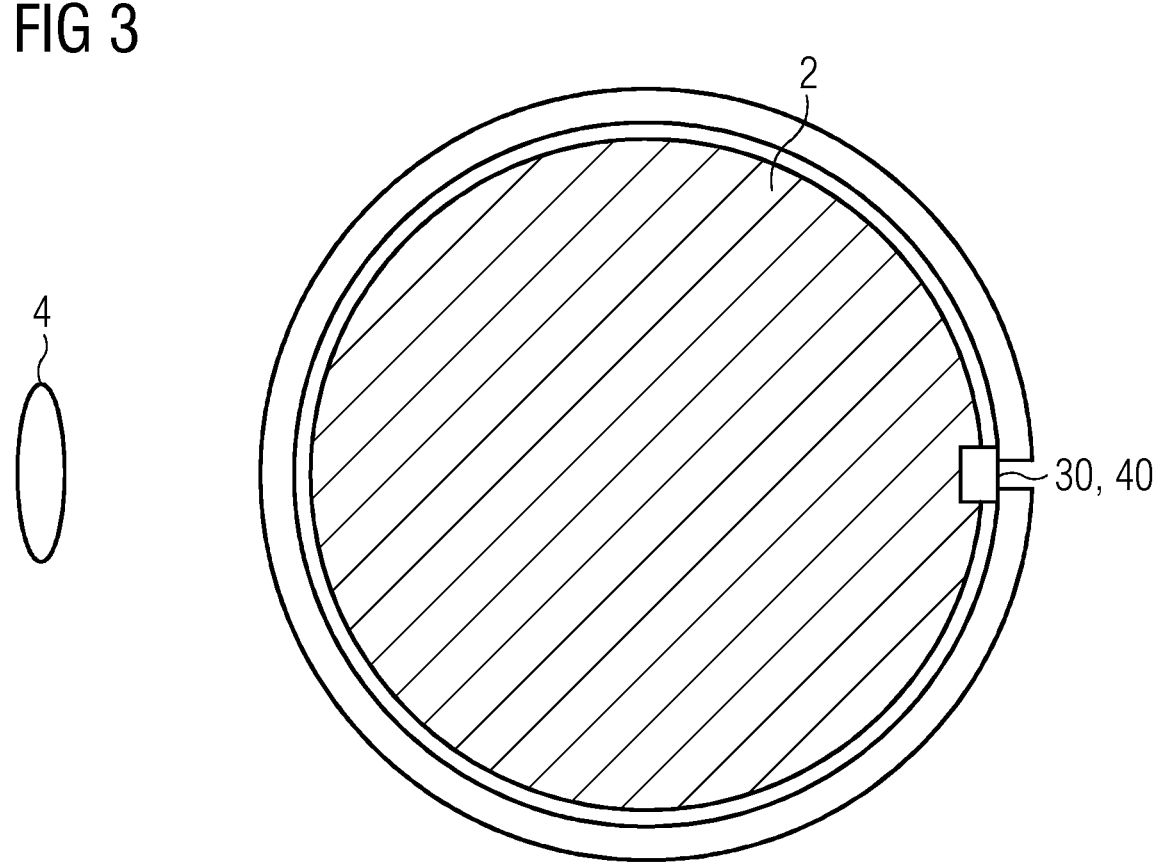
FIG. 3 shows another schematic view of an object position detection device of FIG. 2 associated to a wind turbine.

With reference to FIG. 3, the leaky feeder 20 is geometrically configured as a circular loop surrounding the tower 2.

According to other embodiments of the present invention, any other geometrical configuration is possible, provided that the first electromagnetic signal 100 can be transmitted towards the target object and the second electromagnetic signal 200 can be reflected by the target object towards the leaky feeder 20.

The leaky feeder 20 the electromagnetic transmitter 30 and the electromagnetic receiver 40 are installed on the tower 2.

According to other embodiments of the present invention, the leaky feeder 20 the electromagnetic transmitter 30 and the electromagnetic receiver 40 may be not directly installed on the wind turbine 1, i.e., distanced from the wind turbine 1.

Figure 4:
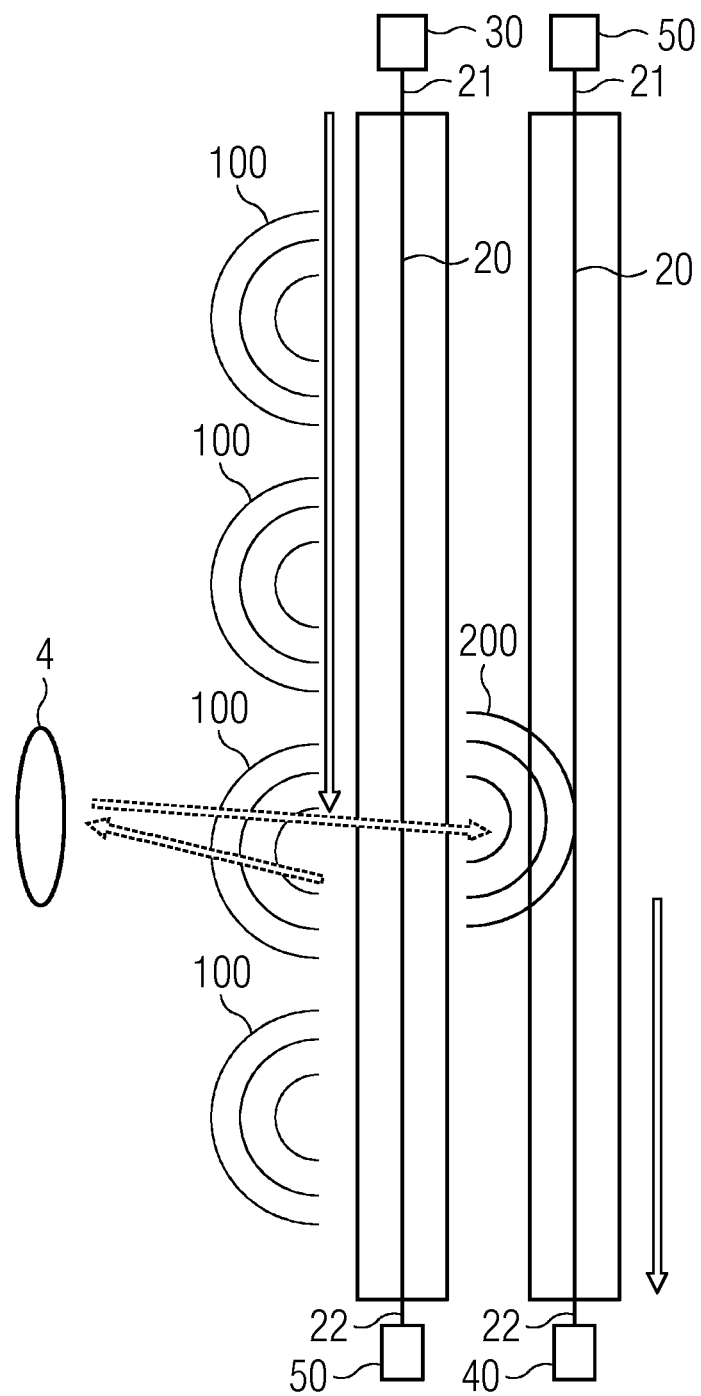
FIG. 4 shows a schematic view of an object position detection device according to a second exemplary embodiment of the present invention.

According to other embodiments of the present invention, a plurality of leaky feeders 20 may be used. As shown in FIG. 4, a second embodiment of the object position and speed detection device 10 comprises two leaky feeders 20, parallel to each other, and extending between respective first ends 21 and second ends 22, respectively adjacent to each other. The two leaky feeders 20 are configured according to an antiparallel configuration, where a first leaky feeder 20 extends between:
   an electromagnetic transmitter 30 connected to the first end 21, and
   a final resistance 50 connected to the second end 22;
while a second leaky feeder 20 extends between:
   a final resistance 50 connected to the first end 21, and
   an electromagnetic receiver 40 connected to the second end 22.

In such embodiment, one first leaky feeder 20, connected to the electromagnetic transmitter 30, is dedicated for the transmission of the first electromagnetic signal 100, while another second leaky feeder 20, connected to the electromagnetic receiver 40, is dedicated for receiving the first electromagnetic signal 200.

Figure 5:
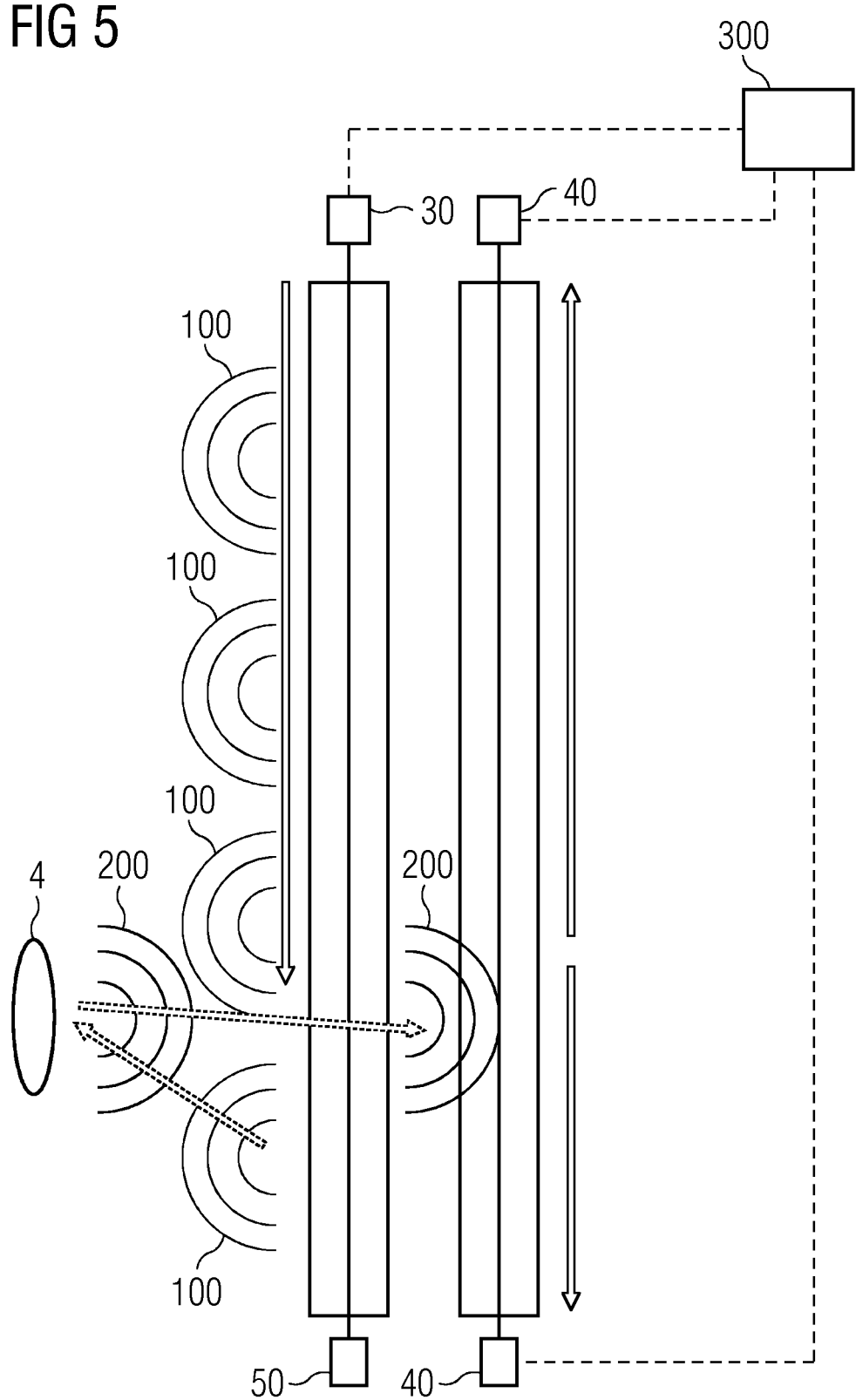
FIG. 5 shows a schematic view of an object position detection device according to a third exemplary embodiment of the present invention.

FIG. 5 shows a third embodiment of the object position and speed detection device 10, which, similarly to the embodiment of FIG. 4, comprises two leaky feeders 20. The third embodiment differs from the second embodiment in that a first leaky feeder 20 extends between:
   an electromagnetic transmitter 30 connected to the first end 21, and
   a final resistance 50 connected to the second end 22;
while a second leaky feeder 20 extends between two electromagnetic receivers 40 respectively connected to the first end 21 and the second end 22. The usage of two receivers permits to derive phase/time information which could be used to determine further information, in particular the position of one blade 4 with reference to vertical yaw axis Z.

According to other embodiments of the present invention (not shown, the object position and speed detection device 10 comprises a plurality of leaky feeders 20 with more than two leaky feeders 20. Such plurality of leaky feeders 20 comprising a first and a second group of leaky feeders 20 respectively connected to one or more electromagnetic transmitters 30 and to one or more electromagnetic receivers 40. Each of the plurality of leaky feeders 20 may be conveniently geometrically configured for optimally following the trajectories of the target objects or of a plurality of target objects.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine including a tower, a nacelle and at least one rotatable blade and an object position and/or speed and/or size detection device comprising:
    at least one coaxial leaky cable;
    at least one electromagnetic transmitter connected to the least one leaky feeder for transmitting a first electromagnetic signal along the least one coaxial leaky cable towards a target object, whose position is to be detected;
    at least one electromagnetic receiver connected to the least one coaxial leaky cable for receiving from the at least one coaxial leaky cable a second electromagnetic signal, the second electromagnetic signal being reflected from the target object when the first electromagnetic signal hits the target object; and
    a processing unit connected to the electromagnetic transmitter and the electromagnetic receiver and configured to analyze the first electromagnetic signal and the second electromagnetic signal for determining the position and/or speed and/or direction and/or the size of the target object.

2. The wind turbine according to claim 1, comprising at least two coaxial leaky cables respectively connected to the at least one electromagnetic transmitter and to the at least one electromagnetic receiver.

3. The wind turbine according to claim 2, comprising a plurality of coaxial leaky cables the plurality of coaxial leaky cables comprising a first and a second group of coaxial leaky cables respectively connected to the at least one electromagnetic transmitter and to the at least one electromagnetic receiver.

4. The wind turbine according to claim 1, comprising only one coaxial leaky cable connected to one electromagnetic transmitter and to one electromagnetic receiver.

5. The wind turbine according to claim 1, wherein the at least one coaxial leaky cable extends between an electromagnetic transmitter or an electromagnetic receiver and a final resistance or termination.

6. The wind turbine according to claim 2, wherein the at least one coaxial leaky cable extends between two electromagnetic receivers.

7. The wind turbine according to claim 1, wherein the at least one coaxial leaky cable is geometrically configured as an arc around the tower.

8. The wind turbine according to claim 1, wherein the at least one coaxial leaky cable is geometrically configured as a loop surrounding the tower.

9. The wind turbine according to claim 1, wherein the least one coaxial leaky cable and/or the at least one electromagnetic transmitter and/or the least one electromagnetic receiver are installed on the tower or inside the tower.

10. The wind turbine according to claim 1, wherein the first electromagnetic signal and the second electromagnetic signal are radar signals.

11. A blade position and/or speed detection device for a wind turbine including a tower and at least one rotatable blade, the blade position detection device comprising:
    at least one coaxial leaky cable;
    at least one electromagnetic transmitter connected to the least one coaxial leaky cable for transmitting a first electromagnetic signal along the least one coaxial leaky cable towards the blade;
    at least one electromagnetic receiver connected to the least one coaxial leaky cable for receiving from the at least one coaxial leaky cable a second electromagnetic signal, the second electromagnetic signal being generated from the blade when reflecting the first electromagnetic signal; and
    a processing unit connected to the electromagnetic transmitter and the electromagnetic receiver and configured to analyze the first electromagnetic signal and the second electromagnetic signal for determining the position of the blade.

12. A method for detecting the position and/or speed of a target object in an area comprising a wind turbine, the method comprising:
    providing at least one coaxial leaky cable in an area comprising a wind turbine;
    transmitting a first electromagnetic signal along the at least one coaxial leaky cable towards a target object, whose position is to be detected;
    measuring a second electromagnetic signal received from the at least one coaxial leaky cable, the second electromagnetic signal being reflected from the target object when the first electromagnetic signal impinges the target object; and
    analysing the first electromagnetic signal and the second electromagnetic signal for determining the position of the target object.

13. The method according to claim 12, wherein the target object is a rotatable blade or the nacelle of the wind turbine.

* * * * *